Aug. 19, 1924.

P. DUNNING 1,505,629

MOUNTING FOR CASINGS OF ELECTRICAL APPARATUS

Original Filed Nov. 17, 1919

Inventor:
Parker Dunning,
by Albert G. Davis
His Attorney.

Patented Aug. 19, 1924.

1,505,629

UNITED STATES PATENT OFFICE.

PARKER DUNNING, OF BLOOMFIELD, NEW JERSEY, ASSIGNOR TO GENERAL ELECTRIC COMPANY, A CORPORATION OF NEW YORK.

MOUNTING FOR CASINGS OF ELECTRICAL APPARATUS.

Original application filed November 17, 1919, Serial No. 338,571. Divided and this application filed March 31, 1922. Serial No. 548,501.

*To all whom it may concern:*

Be it known that I, PARKER DUNNING, a citizen of the United States, residing at Bloomfield, in the county of Essex, State of New Jersey, have invented certain new and useful Improvements in Mountings for Casings of Electrical Apparatus (being a division of my application, Serial No. 338,571, filed November 17, 1919, patented July 4, 1922, No. 1,421,923), of which the following is a specification.

This invention relates to casings for electrical apparatus such as switches or the like, and has for its object the provision of improved devices of this character in which simple and rugged means are provided for installation, inspection and renewal of parts. In one aspect of my invention it comprises improved means for suspending the casing from a conduit outlet box, the arrangement being such that there is a very short distance between the electric terminals of the apparatus enclosed in the casing, and the outlet box. The conductors are thus entirely enclosed, making a compact, safe and convenient arrangement. The conduit box and conduit may be installed at one time, and the casing containing the switch mechanism may be installed at any convenient time. The advantage of such an arrangement is that the electrical installation may be completed without waiting for the casing containing the switch mechanism.

Other objects and purposes of my invention will appear in the course of the following specification in which I have shown my invention embodied in concrete form for purposes of illustration.

Figure 1:
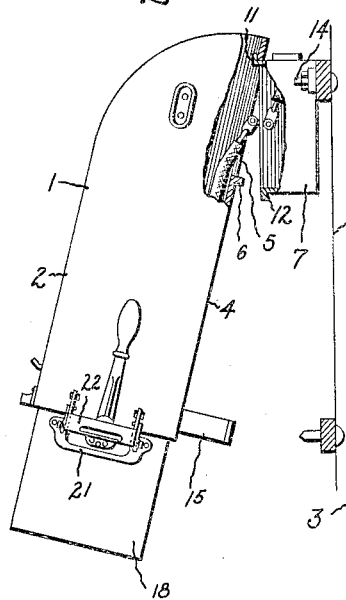
Figure 2:
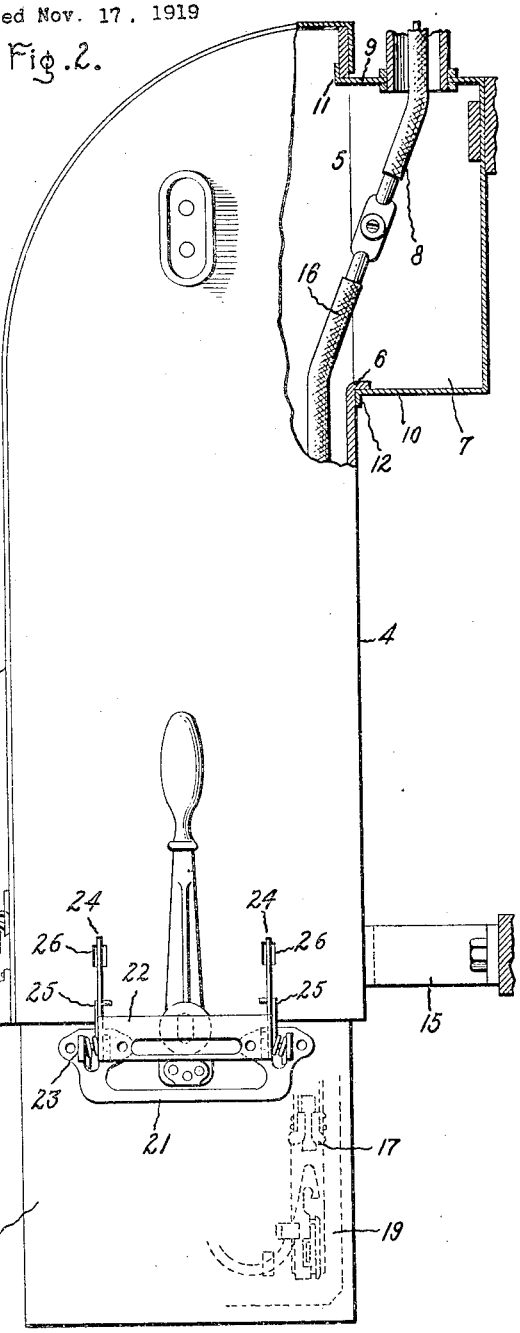

In the accompanying drawings, Fig. 1 is a side elevation of a casing embodying my invention, with parts broken away, in a semi-suspended position with reference to the outlet conduit box; Fig. 2 is an enlarged side view of my invention with parts broken away in which the casing is shown in a normally suspended or operative position.

Referring to the drawings, 1 indicates a casing in which is placed electrical apparatus comprising a switch mechanism, and which is provided with a removable cover 2 and locking means 3. The rear side 4 of the casing 1, that is, the side to which the switch panel is usually secured, is provided with an opening 5 near its upper end. From Fig. 2 it will be observed that the lower edge of the opening 5 is bent outward forming a shoulder 6. 7 indicates a conduit outlet box in which are placed the main line terminals 8. From the drawing it will be seen that the front of the conduit box is open; that the upper side 9 thereof is slightly longer than its lower side 10, and the edge thereof is bent upwardly forming a projection 11. The edge of the lower side 10 is bent downwardly forming a shoulder 12. The conduit box 7 is secured to a suitable support, such as a panel indicated at 13, by any convenient means such as a bolt 14. The opening 5 of the casing 1 is of such size that when its upper edge is suspended upon the upper side 9 of the conduit box, and against the projection 11, as shown in Fig. 1, the shoulder 6 of the box will fit over the lower side 10 of the conduit box and rest against the shoulder 12 thereof, as shown in Fig. 2. The back 4 of the casing 1 is also provided with a member 15 which is of such length that when secured to the panel 13, the casing 1 will be in a vertical position. While this member serves as a brace to reinforce the side 10 of the conduit box, it also serves to help support and secure the casing 1 permanently in position when suspended from the conduit box. The terminals 16 of the apparatus housed in the casing pass through the opening 5 and are suitably connected to the terminals 8 in the conduit box.

The switches or contacts within the casing, which I shall indicate by the numeral 17, are mounted on a panel, in the usual manner, and are located in the lower part of said casing, as shown in Fig. 2. The contacts 17, a portion only of which are indicated in dotted lines, are immersed in a body of oil or other insulating liquid for reasons well known. The oil is held in a container or well 18, which is suspended from the upper part of the casing. On each of its two opposite sides the oil well 18 is provided with a handle 21 and a spring latch member 22, which are mounted on the outside thereof near their respective upper edges as shown in the drawings. The member 22 is pivoted at 23 and is provided with two hooks 24 which are normally urged inwardly against the sides of the oil well by springs 25. The casing 1 is provided with a set of openings 26 arranged to be engaged by said hooks 24. Therefore, when the oil well 18 telescopes the member 19, thereby immersing the switch 17 in oil, the hooks 24 engage in the openings 26 respectively, and thus serve as a means of support to maintain the oil well in this position, as shown in Fig. 1. Should it be desired to inspect the contacts 17, or make them accessible for any other purpose, the oil well 18 may be lowered. This is done by slightly raising the oil well by the handles 21 and depressing the members 22 which disengages the hooks 24 from the respective openings 26. As shown in the drawings, each member 22, which carries the hooks 24, is in close proximity to the handle 21, so that when that handle is grasped, the hooks may be conveniently released by the thumb of the hand pressing on the member 22. The oil well is thus free to move and may be lowered. This feature of my invention is covered in my original application, Serial No. 338,571, patented July 4, 1922, No. 1,421,923.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with a casing for electrical apparatus having switch mechanism supported therein at the lower end thereof, of electrical conductors for connection with the said switch mechanism, and a fixed conduit outlet box having an open front, the said casing having an opening therein at the upper end of the back thereof and supported by the said outlet box with the said opening of the casing and the open front of the outlet box registering so as to form a continuous closed passage for the said conductors.

2. The combination with a casing for electrical apparatus having switch mechanism supported therein at the lower end thereof, of electrical conductors for connection with the said switch mechanism, a fixed conduit outlet box having an open front, the said casing having an opening therein at the upper end of the back thereof and supported by the said outlet box with the said opening of the casing and the open front of the outlet box registering so as to form a continuous closed passage for the said conductors, and a brace for the back of said casing which also serves as a support for the casing to assist the said outlet box.

3. The combination with a casing for electrical apparatus having switch mechanism supported therein at the lower end thereof, of electrical conductors for connection with the said switch mechanism, a fixed conduit outlet box having an open front, the said casing having an opening therein at the upper end of the back thereof which registers with the open front of the said outlet box so as to form a continuous closed passage for the said conductors, and connections whereby the said casing is hung from the said outlet box in a vertical position and the casing is removed from the outlet box by raising the casing and moving the casing away from the outlet box.

4. The combination with a casing for electrical apparatus provided with an opening, the lower edge of which is provided with a shoulder, of a conduit outlet box having an open front, the upper edge of which is provided with a shoulder, whereby the casing is supported from the box and the opening of the casing registers with the opening of the box so as to form a continuous closed passage for the conductors.

In witness whereof, I have hereunto set my hand this 29th day of March, 1922.

PARKER DUNNING.